| United States Patent [19] | [11] | 4,143,181 |
|---|---|---|
| Cahn et al. | [45] | Mar. 6, 1979 |

[54] PROCESS FOR THE PREPARATION OF A COATING FOR GLASS OR CERAMIC SURFACES

[75] Inventors: André Cahn, Paris; Jacques Sanson, Senlis; Henri Vanspeybroeck, Villiers St Sepulcre; Robert Dumas, Chalon-sur-Saône; Michel Mossé, Bures-sur-Yvettes, all of France

[73] Assignees: Societe Francaise Duco, Stains; Societe Generale pour l'Emballage, Paris, both of France

[21] Appl. No.: 816,644

[22] Filed: Jul. 18, 1977

[30] Foreign Application Priority Data

Aug. 3, 1976 [FR] France ............................... 76 23680
Jul. 1, 1977 [FR] France ............................... 77 20311

[51] Int. Cl.$^2$ .............................................. B05D 3/02
[52] U.S. Cl. ..................................... 427/195; 427/27; 427/202; 427/375; 427/385 A; 427/386; 427/407 A; 428/35; 428/431; 428/482; 428/483
[58] Field of Search ................. 427/27, 195, 202, 375, 427/385 A, 386, 407 A; 428/35, 430, 431, 435, 436, 441, 442, 482, 483

[56] References Cited

U.S. PATENT DOCUMENTS

| 3,624,232 | 11/1971 | Van Dorp et al. ................... 427/195 |
|---|---|---|
| 3,700,546 | 10/1972 | Terenzi ................................ 428/431 |
| 3,823,032 | 7/1974 | Ukai .................................... 428/35 X |
| 3,864,152 | 2/1975 | Kitamura et al. ....................... 428/35 |
| 3,877,969 | 4/1975 | Tatsumi et al. ..................... 428/35 X |
| 3,889,031 | 6/1975 | Tatsumi et al. ..................... 428/35 X |
| 3,903,339 | 9/1975 | Brockway et al. ........... 427/407 A X |
| 3,933,407 | 1/1976 | Tu et al. ...................... 427/385 A X |
| 3,944,100 | 3/1976 | Brockway ......................... 428/35 X |
| 3,954,901 | 5/1976 | Watanabe et al. ............... 427/195 X |
| 4,053,666 | 10/1977 | Taylor et al. ........................... 428/35 |

*Primary Examiner*—Shrive P. Beck
*Attorney, Agent, or Firm*—Burns, Doane, Swecker & Mathis

[57] ABSTRACT

Process for the preparation of a coating for glass and ceramic surfaces, comprising applying a first layer of a coating composition consisting of a hydroxylated material selected from hydroxylated polyesters, polyether-polyols, polycaprolactone-polyols and hydroxylated polyesterdiisocyanate adducts, and of a cross-linking agent; thermally cross-linking said first layer; and applying a surface layer of a coating composition consisting of a film-forming material selected from hydroxylated polyesters, optionally modified epoxy resins and acrylic resins, and of a cross-linking agent; and thermally cross-linking the resulting surface layer.

13 Claims, No Drawings

PROCESS FOR THE PREPARATION OF A COATING FOR GLASS OR CERAMIC SURFACES

This invention relates to a process for the preparation of a coating based on film-forming materials, adapted to be coated on glass or ceramic surfaces, said coating being particularly useful for preventing the dispersion of fragments in case of breakage of the surface, while maintaining the original appearance of the surface being coated.

The process of this invention is particularly advantageous to form a coating on bottles adapted to contain sparkling or carbonated beverages, vacuum enclosures such as fluorescent tubes, electric bulbs, sealed cathodic tubes and equipment operated under a vacuum or under pressure.

It is already known to produce plastic coatings on glass articles by depositing film-forming coatings comprising one or more plastic layers, as powders or solutions. In particular, it is known to produce a three-layer coating comprising successively, from the inner portion to the outer portion of the coating, a first layer consisting of a silane, a second layer of a butadiene-styrene copolymer, and a surface layer consisting of a hydroxylated isocyanate-polybutadiene adduct, cross-linked with a mixture of epoxy resin and polyurethane resin, all three layers being applied by means of solutions of said materials in organic solvents.

Another process for the production of dual-layer plastic coatings is disclosed in U.S. Pat. No. 3,877,969 (TAKEDA). This process comprises applying a first layer comprising powdered copolymers of ethylene and vinyl acetate, acrylic acid or methacrylic acid, and then a thermoplastic polyurethane surface layer, by means of solutions.

However, none of the aforementioned patents satisfies the combined criteria it is desirable to impart to the resulting coatings.

Thus, for example, the coatings produced by the process of this invention allow reuse of the bottles after washing. On the other hand, the coatings obtained by the process of the present invention provide lighter weight bottles, because the plastic coating applied increases the mechanical strength of the latter. In addition, the coating produced according to the process of this invention insures that the fragments are satisfactorily retained when the surface is accidentally broken.

Therefore, the present invention provides a process for the preparation of a coating for glass or ceramic surfaces, comprising applying a first layer of a coating composition consisting of a hydroxylated material selected from hydroxylated polyesters, polycaprolactone-polyols and hydroxylated polyester-diisocyanate adducts, and of a cross-linking agent; thermally cross-linking said first layer; then applying a surface layer of a coating composition consisting of a film-forming material selected from hydroxylated polyesters, optionally modified epoxy and acrylic resins, and of a cross-linking agent; and thermally cross-linking the resulting surface layer.

The process of the present invention comprises coating glass surfaces, typically bottle surfaces, with a first layer of a relatively resilient polymer resin, preferably having an elongation at break in excess of 100%, said first layer being adapted to retain the fragments in case of breakage of the bottle, then with a surface layer of a polymer resin having a high surface hardness, preferably having an elongation at break below 10%, and which is alkali resistant. This combination of the two aforementioned coating layers provides glass articles with reduced dispersal of the fragments upon accidental breakage and which, in addition, have a sufficient surface hardness to be abrasion- or tear-resistant on handling and which, therefore, may be reused.

The film-forming materials suitable for the preparation of the coating composition of the first layer are selected from the following resin classes: saturated and unsaturated hydroxylated polyester resins, polyetherpolyols, polycaprolactonemonomers.

A more detailed description of a number of said film-forming materials is given below.

SATURATED AND UNSATURATED HYDROXYLATED POLYESTER RESINS

Said resins result from the polycondensation of aliphatic or aromatic polyacids and di- or tri-functional polyhydric alcohols.

Examples of saturated aliphatic dibasic acids include adipic, azelaic, sebacic and chlorendic acids.

Examples of unsaturated aliphatic dibasic acids or anhydrides include maleic anhydride, fumaric acid and itaconic acid.

Examples of aromatic dibasic acids include orthophthalic, isophthalic, terephthalic acids, the esters of said acids with lower aliphatic monohydric alcohols and the halogenated and hydrogenated derivatives of said acids, such as hexachlorophtalic acid, tetrahydrophthalic acid, hexachloro-endomethylene-tetrahydrophthalic anhydride, and the like, or mixtures thereof.

The polyols may be, inter alia, ethylene glycol, propylene glycol, trimethylolethane, trimethylolpropane, trimethylolhexane, pentaerythritol, 1,1-isopropylidene-bis(p-phenylene-oxy)diethanol or dipropanol, and the like. Other useful polyols include also a polycaprolactone-polyol preferably having a molecular weight of about 500 to about 2000, and mixtures thereof with the aforesaid polyols.

The hydroxyl numbers of said polyesters is generally 10–200 and preferably between 50 and 100.

In such cases where saturated polyester resins are used as adducts with a diisocyanate, polycaprolactone-diols (having preferably a molecular weight of 500–2000) having a diisocyanate-extended chain are used.

The cross-linking of the above hydroxylated saturated polyesters or hydroxylated adducts is preferably effected with optionally blocked polyisocyanates (e.g., trifunctional, aliphatic or cycloaliphatic), particularly an isophorone diisocyanate polyisocyanate, biurets of diisocyanates (e.g., biurets obtained from 1,6-hexamethylene diisocyanate, ethylene diisocyanate, trimethyl hexamethylene diisocyanate, bis-4-isocyanate cyclohexyl-methane), or triisocyanates obtained by reaction of diisocyanates with triols, such as trimethylolpropane, trimethylolhexane and glycerol.

The use of blocked polyisocyanates permits the preforming of the coating compositions, with subsequent thermal curing of the coated layer at the desired time.

The film-forming materials suitable for the preparation of the coating composition of the surface layer are selected from the following resin classes:

I. SATURATED AND UNSATURATED HYDROXYLATED POLYESTER RESINS

Said resins result from the polycondensation of aliphatic or aromatic polybasic acids and of di- or tri-functional polyhydroxylic alcohols.

Examples of saturated aliphatic dibasic acids include adipic, azelaic, sebacic and chlorendic acids.

Examples of unsaturated dibasic aliphatic acids or anhydrides include maleic anhydride, fumaric acid and itaconic acid.

Examples of dibasic aromatic acids include orthophthalic, isophthalic, terephthalic acids, the esters of said acids with lower aliphatic monohydroxylic alcohols and the halogenated and hydrogenated derivatives of said acids, such as hexachlorophthalic acid, tetrahydrophthalic acid, endomethylene tetrahydrophthalic acid, hexachloro endomethylene tetrahydrophthalic anhydride, and the like, or mixtures thereof.

The polyols may be, inter alia, ethylene glycol, propylene glycol, neopentylglycol, trimethylolethane, trimethylolpropane, trimethylolhexane, pentaerythritol, 1,1-isopropylidene-bis(p-phenylene oxy)-diethanol or dipropanol, and the like.

The molecular weight of the resins is between 500 and 6000, preferably between 1200 and 2500.

The hydroxyl number is generally between 30 and 200, preferably between 50 and 100.

Said polyesters may be cross-linked with:

1. blocked polyisocyanates

The polyisocyanates may be of isophoronediisocyanate, trimethylhexamethylene diisocyanate, bis-(4-isocyanate-cyclohexyl)methane type. Said polyisocyanates are blocked by converting them to adducts with a polyol, an oxime, caprolactame or a phenolic compound. Examples of polyols include ethylene glycol, 1,4-butane-diol, neopentylglycol, trimethylolpropane, trimethylolhexane, trimethylolpentane diol, bis-(4-hydroxy-cyclohexyl)propane.

2. melamines

The polymethoxymethyl melamines are particularly suitable.

3. anhydrides

The polyfunctional anhydrides and their corresponding acids may be used for cross-linking said polyesters.

II. EPOXY RESINS

The epoxy resins generally used are epichlorohydrin-Bisphenol A resins having a molecular weight of about 1000-2000, the more suitable molecular weights being within the 1300-1500 range. Said resins may be cross-linked with amines, amides such as dicyandiamide, imidazolines such as 2-phenyl-imidazoline, polyanhydrides, blocked polyisocyanates identical with those described under I,1, carboxylated polyesters, imidazoles.

III. ACRYLIC RESINS

These consist predominantly of methyl, butyl, isobutyl, 2-ethylhexyl and lauryl acrylate or methacrylate copolymers, optionally modified with acids such as acrylic acid and methacrylic acid, with hydroxylated monomers such as hydroxyethyl and hydroxypropyl acrylates or methacrylates, with epoxy monomers such as glycidyl methacrylate, or also with styrene.

Said copolymers may be cross-linked with melamines such as polymethoxymethylmelamines, polyanhydrides, blocked isocyanates, epoxy resins.

The process of this invention is operated in the following manner:

The first layer, or under-layer, is applied in the hot or in the cold on glass articles, such as bottles, for example, preheated or not, from an organic solution of the coating composition obtained by pre-mixing all the components prior to application, or by simultaneous spraying of solutions of the various individual components. The coating is applied by any conventional means, advantageously by combination electrostatic and pneumatic gun spraying, the first layer having suitably a thickness of 20 to 80 microns, after drying. In the case of bottle coating, it was found that the deposition of the material on the cable ring and mandrels could be prevented by combining the action of an air curtain and of a counter-electrode under the same potential charge than the electrostatic sprayers. The use of a flat jet pneumatic gun in combination with the above means enhances the appearance of the coating.

Said first layer is then thermally treated to remove the solvent, to impart the desired film-forming properties thereto and to reach a sufficient temperature level for the application of the surface layer. This thermal treatment may be effected with any conventional means. It is particularly advantageous, within the scope of this invention, to effect this treatment immediately after coating the first layer, using infrared radiations having a wavelength specially adapted for the heating of glass.

Such a type of heating provides rapidly, and in a manner compatible with high rate production, the temperature required for the cross-linking of said first layer and the thermal reserve useful for the application and the cross-linking of the surface layer.

The surface layer is preferably coated as a fine powder, by soaking in an electrostatic or non-electrostatic fluidized bath, or by means of an electrostatic gun. In the latter case, the protection of the rings is insured by means of an air curtain and the use of a flat jet nozzle on the higher portion of the bottles. This surface layer is then cross-linked by means of a suitable thermal treatment which may be conducted by any conventional procedure: such as heating by means of a hot air convector, IR radiations, or gas or electric heating, or microwave heating. The glass articles are then cooled either naturally or by an accelerated procedure under an air atmosphere or with a liquid, by spraying or immersion.

Other characteristics and advantages of this invention will become apparent from the following description of examples embodying the process of this invention, which are given solely for illustrative purposes.

EXAMPLE 1

(a) A saturated polyester resin solution is first prepared from the following components (in parts by weight), to form the first layer:

Neopentylglcyol: 21.8 parts
Trimethylolpropane: 12.3 parts
Azelaic acid: 47.7 parts The above mixture is heated in a flask, under an inert gas atmosphere, at a temperature of 230° C., until an acid number of less than 5 is obtained; after the reaction, the mixture is diluted with methyl isobutyl ketone in a ratio of 80 parts of said mixture per 20 parts solvent. The resulting solution has a Brookfield viscosity of about 10 poises at 25° C. The dry resin has a hydroxyl content of about 4%.

(b) To 100 parts of the latter solution are added 65 parts of a 75% solution of 1,6-hexamethylene diisocyanate biuret (sold by BAYER under the name Desmodur N 75) in ethyl glycol acetate, 0.05 part dibutyltin dilaurate, 2 parts of an alkylphenol antioxidant such as the product sold as Ionol CP by SHELL or Irganox 1076 by CIBA GEIGY, and 40 parts methyl isobutyl ketone to permit the application of the resin on bottles, by means of the devices described hereinunder.

(c) The mixture prepared above is transferred to an air-pressurized container and is then applied on the articles to be coated by means of 2 electrostatic guns such as commercially available from TUNZINI-SAMES under the name Megastatron, and of a pneumatic gun. The electrostatic spray guns are adapted to coat the body and bottom portion of the bottle, while the pneumatic spray gun is adapted to coat the neck portion of the bottle. In addition, a negatively charged ($-40$ KV to $-60$ KV) copper wire electrode is placed above the electrostatic spray guns, between the vertical planes containing the bottle and the guns. An air curtain is also used to prevent the deposition of film-forming resin on the rings and bottle supports. A layer having a thickness of about 30 to about 60 microns, preferably of about 40 microns is thus coated.

(d) After pre-drying for about 20 seconds, the bottles are placed in an oven provided with infrared emitting means. The duration of the thermal treatment is dependent on the rate at which the bottles are moved through the oven, but is adjusted to give a temperature of about 220° C. on the outer surface of the bottles at the outlet of the pre-heating device.

The cross-linked first layer has an elongation at break in excess of 100%.

(e) A few seconds after the bottles are removed from the preheating oven, a surface layer of a fine powdered film-forming material having the following composition is applied (parts by weight):

| | | |
|---|---|---|
| Blocked isocyanate (isophorone diisocyanate + diethylene glycol + caprolactame) | 25 | parts |
| Powdered saturated polyester resin ($\sim$31% terephthalic acid + 60% 1,1-isopropylidene-bis(p-phenylene oxy)diethanol + 9% neopentylglycol) having the following characteristics: Acid number: 1.6 Hydroxyl number: 62 Molecular weight: 2000 | 75 | parts |
| Acrylic type surfactant (Modaflow, MONSANTO) to improve the levelling of the resin | 1 | part |
| Tin isocarboxylate (accelerator) | 0.2 | part |

The powder is produced by mixing and dispersing the above materials in a Komalaxeur PR 46 type extruder available from BUSS, at a temperature of 100° C., after which the mixture is cooled and powdered to a particle size of 5–80 microns.

This powder is applied electrostatically, for example by means of a plurality of Megastajet spray guns (available from SAMES) arranged in a sufficient number to provide a layer having a regular thickness of 30–60 microns, preferably of about 40 microns.

The thus coated bottles are placed in an oven, for the purpose of cross-linking the powder. The thermal treatment is effected to permit the deblocking or deprotection of the isophorone diisocyanate so that the latter may react with the saturated polyester. The temperature required for this purpose is comprised between 180° and 200° C. and is maintained at said level for a period of time of about 6 minutes.

The bottles are then allowed to cool naturally, to a temperature at which they may be handled.

The resulting surface layer has an elongation at break which is less than 10%.

The bottles thus produced have a clear sparkling appearance and retain their original shade. They are smooth and hard to the touch.

To evaluate the properties of the bottles coated according to the process of this invention, the following tests are carried out.

FRAGMENT RETAINING ABILITY

Contour type (Coca-Cola ®) bottles of 1030 cc capacity, weighing 660g, provided with the above described coating, are filled with carbonated water (1020 cc) containing 38 volumes $CO_2$. The pressure inside the bottles is about 4 atmospheres at 20° C. The bottles are horizontally suspended at a distance of 1.20 m above a steel plate located in the center of a 1 m diameter receiver adapted to recover the fragments, and the receiver comprises on its peripheral portion a 17.5 cm wide and 10 cm high annular grove.

The bottles are then dropped and break against the steel plate. The ratio between the weight of the fragments contained inside the 1 m diameter receiver and the total weight of the bottle prior to shattering is then determined.

Comparative determinations are effected with uncoated reference bottles.

The values found result from the mean value obtained after dropping 10 bottles, and are given in following Table I:

TABLE I

| | | $\dfrac{\text{Weight in receiver}}{\text{Original weight}} \times 100$ (mean value) | Standard deviation |
|---|---|---|---|
| Reference bottles | 660 g | 70 | 4 |
| Coated bottles | 660 g | 93 | 4 |

The high efficiency of the coating for retaining the fragments, with respect to uncoated bottles, is apparent from the above results.

RECYCLING ABILITY FOR MULTIPLE USES

Bottles are immersed in a 5% sodium hydroxide solution for 30 minutes at 65° C., after which they are rinsed with cold water, filled and placed in a horizontally arranged cylindrical container which is rotated around its axis on two driven rollers, for 5 minutes. The bottles are then examined: no tear is noted after 10 consecutive cycles, where the appearance of the coating is concerned.

EXAMPLE II

Coating compositions for Handy 34,5 BSH type bottles (capacity: 345 cc; weight: 186 g) are prepared. The compositions are coated under the same thickness conditions as in Example I. The first layer has the same composition as that of Example I, except that the dibutyltin dilaurate is omitted. The surface layer has a composition analogous to that of Example I. Both layers are applied in the same manner as in Example I. The baking of the first layer is conducted in an air convector oven controlled at 180° C. in which the bottles remain for a residence time of 15 minutes, and the baking of the surface layer is conducted during 20 minutes in the same oven controlled at 180° C.

A series of 10 bottles thus coated is submitted to the test for the ability to retain fragments (filling: 330 cc) under the conditions described in Example I. The results obtained are given in Table II.

TABLE II

| | $\frac{\text{Weight in receiver}}{\text{Original weight}} \times 100$ (mean value) | Standard deviation |
|---|---|---|
| Uncoated bottles | 47 | 20 |
| Coated bottles | 96 | 5 |

The recycling ability is determined under the same conditions as in Example I. It is found that the behavior of the bottles is the same as in Example I. The bottles exhibit neither tearing off or peeling of the coating after 7 cycles of abuse.

EXAMPLE III

A saturated polyester resin solution for the coating of the first layer is prepared from the following components (parts by weight).
Neopentylglycol: 34.3 parts
Trimethylolpropane: 19.3 parts
Isophthalic acid: 16.3 parts
Adipic acid: 43.8 parts The above mixture is heated in a flask, at 230° C., under an inert gas atmosphere, until an acid number of less than 5 is obtained. On completion of the reaction, the mixture is diluted at a rate of 80 parts dry material per 20 parts ethylglycol acetate. The hydroxyl content is of the order of 4.5%.

A mixture identical with that described in Example I(b) is then prepared from this solution, except that the dibutyltin dilaurate is omitted. Handy 34,5 BSH type bottles are then coated with the above described coating composition (first layer), and with a coating composition for the surface layer analogous to that of Example I, after which they are thermally treated under the same conditions as in Example II. The first layer exhibits also an elongation at break in excess of 100% after crosslinking.

The ability to retain fragments is determined with 10 bottles, under the conditions described in the previous Examples. The results obtained are given in Table III.

TABLE III

| | $\frac{\text{Weight in receiver}}{\text{Original weight}} \times 100$ (mean value) | Standard deviation |
|---|---|---|
| Uncoated bottles | 47 | 20 |
| Coated bottles | 65 | 15 |

EXAMPLE IV

A saturated polyester resin solution for the first layer is prepared from the following components (parts by weight).
Neopentylglycol: 22.1 parts
Trimethylolpropane: 12.4 parts
Isophthalic acid: 10.5 parts
Azelaic acid: 36.3 parts After treatment under the same conditions as described in Example III, the mixture gives a dry resin having a hydroxyl content of about 4% and a Brookfield viscosity of about 20 poises at 25° C. when diluted in ethylglycol acetate at a rate of 80 parts resin per 20 parts solvent.

A mixture identical with that described in Example I(b) is then prepared from this solution, except that the dibutyltin dilaurate is omitted, after which both the first layer and the surface layer are coated as described in Example I. The resulting first layer exhibits an elongation at break in excess of 100%.

The determination of the ability to retain fragments gives a mean value of 83 (standard deviation: 12) for the coated bottles.

EXAMPLE V

A hydroxylated polyester-polyisocyanate adduct is prepared in the following manner. The following components are added in a reactor:(parts by weight):
Polycaprolactonediol (PCP 200, Union Carbide; M.W. 530; M.p. 30°–40° C.): 371 parts
Polyethylene glycol (M.W. about 5000): 60 parts
Trimethylolpropane: 4.5 parts The mixture is heated to 65° C. until a homogeneous mass is obtained and is then cooled to 25° C. Isophorone diisocyanate (165 parts) and dibutyltin dilaurate (0.4 part) are then added thereto. The temperature is maintained at 85° C. until the Gardner-Holdt viscosity of the resin-isbutyl acetate (50%:50%) mixture reaches a value between U and V. Ethylglycol acetate (150 parts) is then added, and the resulting material is further heated for 4 hours at the same temperature level, after which it is diluted with 250 parts methylethylketone. The resulting resin solution (60% dry extract) is diluted to 40% dry extract by addition of methylisobutylketone.

To 100 parts of said solution are added 15 parts (by weight) Desmodur N 75. The mixture is then applied on Handy BSH 34,5 type bottles and on Contour type bottles having a capacity of 660 g or 920 g. The resulting first layer has the same thickness as that of Example I and exhibits an elongation at break in excess of 100%. A surface layer analogous to that of Example I is then applied, and both layers are baked as described in Example II.

The bottles are then submitted to tests for the determination of their fragment retaining ability, their recycling ability, and for the determination of the enhancement of their mechanical properties, with respect to uncoated reference bottles. The results obtained are given in Table IV below.

TABLE IV

| | Coated bottles | | Reference bottles | |
|---|---|---|---|---|
| | Mean value | Standard deviation | Mean value | Standard deviation |
| Fragment retaining ability: | | | | |
| Handy 34,5 | 78 | 18 | 70 | 12 |
| Contour 660 g | 93.8 | 6.3 | 76 | 6 |
| Shattering pressure:[x] | | | | |
| Contour 660 g | 23.5 | 3.1 | 18.3 | 1.2 |
| Contour 920 g | 25.9 | 3.0 | 17.8 | 1.9 |

[x]The shattering pressure (daN/cm$^2$) is determined with an A.G.R. Increment Pressure Tester The bottles are submitted to an abuse test with a Line Simulator AGR apparatus after immersion in a sodium hydroxide solution under the following conditions:

The bottles are immersed for 30 minutes in a 5% sodium hydroxide solution heated to 70° C., and are then rinsed for a few minutes under running water, after which they are filled with water at 4° C. They are then placed in the Line Simulator AGR for 5 minutes under a water spray. The test is repeated ten times, at 24 hour intervals. No substantial tear is noted on the bottles; only marks left by the roller guides of the simulator are noted.

COMPARATIVE EXAMPLE VI

Handy BSH 34,5 type bottles are coated with the first-layer composition described in Example V, but the surface coating is omitted. Baking is effected under infrared radiations, as described in Example I(d).

A good fragment retaining ability is noted (mean value of 91 for 10 bottles), but the coating is not resistant to the sodium hydroxide washing and abuse cycles described in the preceding Examples.

COMPARATIVE EXAMPLE VII

Handy BSH 34,5 type bottles are coated with the surface layer composition described in Example I(e), said bottles having been pre-coated with a γ-aminopropyltrimethoxy-silane (A 187, Union carbide) or N-(trimethoxy-silylpropyl)ethylene diamine (QZ 85009, Dow Corning) solution, as disclosed in French patent application 74 41 779, and are then pre-heated at 180° C. for 15 minutes.

After application of the powder, the bottles are submitted to a post-baking treatment for 30 minutes at 180° C. in the same air convection oven.

The thus coated bottles exhibit a marked increase of the mean shattering pressure together with a good recycling ability, but have a poor fragment retaining ability (mean value: 52; standard deviation: 18 as compared to a value of 40 for the reference bottles).

It is apparent from the results obtained in Examples I–VII that alone the bottles coated with the two layers produced by the process of this invention exhibit simultaneously fragment retaining, recycling ability for subsequent use, and enhanced shattering pressure resistance properties, which properties are critical for the industrial usefulness of the process. In addition, said coating exhibits good alkali resistance.

EXAMPLE VIII (a) A saturated polyester resin solution for the first layer is first prepared from the following components (parts by weight):

Polycaprolactone-diol (M.W. 530; M.p. 30°–40° C.): 73 parts
Trimethylolpropane: 8 parts
Azelaic acid: 23 parts The above mixture is heated in a flask at 180° C., under an inert gas atmosphere, until an acid number of less than 5 is obtained. After the reaction, the mixture is diluted with methyl isobutyl ketone, in a ratio of 80 parts mixture to 20 parts solvent. The Brookfield viscosity of the resulting solution is about 2 poises at 25° C. The hydroxyl content of the dry resin is about 3%.

(b) To 100 parts of the above solution are added 63 parts of a 70% solution in ethylglycol acetate of an isophorone diisocyanate polyisocyanate (sold by VEBA Chemie under the name Durcisseur T 1890), 0.3 parts dibutyltin dilaurate, 2 parts antioxidant of the alkylphenol class (such as Ionol CP sold by SHELL, or Irganox 1076 sold by CIBA GEIGY) and 20 parts methylisobutylketone to permit the application of the resin on the bottles with the devices described below.

(c) The mixture prepared above is transferred to an air-pressurized container and is then applied on the articles to be coated by means of 2 electrostatic spray-guns such as commercially available from TUNZINI-SAMES under the name Megastatron, and of a pneumatic spray-gun. The electrostatic spray-guns are adapted to coat the body and bottom portions of the bottle, while the pneumatic spray-gun in adapted to coat the neck portion of the bottle. In addition, a negatively charged (−40 KV to −60 KV) copper wire electrode is placed above the electrostatic spray-guns, between the vertical planes containing the bottles and the guns. An air curtain is also used to prevent the deposition of film-forming resin on the rings and bottle supports. A layer having a weight of about 4 g to about 10 g is deposited on a Contour type bottle of 660 g and 7 $dm^2$ outer surface, preferably of about 6 g.

(d) After pre-drying for about 20 seconds, the bottles are placed in an oven provided with infrared emitting means. The duration of the thermal treatment is dependent on the rate at which the bottles are moved through the oven, but is adjusted to provide a temperature of about 200° C. on the outer surface of the bottles at the outlet of the pre-heating device.

The cross-linked first layer has an elongation at break in excess of 100%.

(e) A few seconds after the bottles are removed from the preheating oven, a surface layer of a finely powdered film-forming material having the following composition is applied (parts by weight):

Epoxy resin (M.W. 1400; Epoxy number 840–940; M.p. 94° C.): 100 parts
2-Phenyl-imidazoline: 6.5 parts
Silicone oil surfactant: 0.3 parts The powder is prepared by mixing and dispersing the above ingredients in a Komalaxeur PR 100 type extruder available from BUSS, at a temperature of 100° C., after which the mixture is cooled and powdered to a particle size of 5–80 microns.

This powder is applied electrostatically, for example by means of a plurality of Megastajet spray guns (available from SAMES) arranged in a sufficient number to provide a layer having a weight of about 4 g to 10 g on a 660 g Contour type bottle having an outer surface of 7 $dm^2$, said layer having preferably a weight of about 6 g.

The thus coated bottles are placed in an oven, for the purpose of cross-linking the powder.

The temperature required for the polymerization is comprised between 130° and 240° C. and is maintained at said level during a period of time of about 13 minutes to about 30 seconds.

The bottles are then allowed to cool naturally, to a temperature at which they may be handled.

The resulting surface layer has an elongation at break of less than 10%.

The bottles thus produced have a clear sparkling appearance and retain their original shade. They are smooth and hard to the touch.

To evaluate the properties of the bottles coated according to the process of the invention, the following tests are carried out.

FRAGMENT RETAINING ABILITY

Contour type (Coca-Cola) bottles of 1030 cc capacity, weighing 660 g, provided with the above described coating, are filled with carbonated water (1020 cc) containing 38 volumes $CO_2$. The pressure inside the bottles is about 4 atmospheres at 20° C. The bottles are horizontally suspended at a distance of 1.20 m above a steel plate located in the center of a 1 m diameter receiver adapted to recover the fragments, and the receiver comprises on its peripheral portion a 17.5 cm wide and 10 cm high annular groove.

The bottles are then dropped and they break against the steel plate. The ratio between the weight of the fragments contained inside the 1 m diameter receiver and the total weight of the bottle prior to shattering is then determined.

Comparative determinations are effected with uncoated reference bottles.

The values found result from the mean value obtained after dropping 10 bottles, and are given in the following Table:

TABLE V

| | | $\frac{\text{Weight in receiver}}{\text{Original weight mean value}} \times 100$ | Standard deviation |
|---|---|---|---|
| Reference bottles | 660 g | 70 | 4 |
| Coated bottles | 660 g | 95 | 3 |

The high fragment retaining efficiency of the coating, with respect to uncoated bottles, is apparent from the above results.

RECYCLING ABILITY FOR MULTIPLE USES

The bottles are submitted to an abuse test in a Line Simulator AGR apparatus after immersion in a sodium hydroxide solution, under the following conditions:

The bottles are immersed for one hour in a solution containing 3.5% sodium hydroxide, 1% trisodium phosphate and 1% sodium gluconate heated to 70° C., and are then rinsed for a few minutes under running water, after which they are filled with water at 4° C. They are then placed in the Line Simulator AGR for 5 minutes, under a water spray, in the following manner: the bottles are placed on the lubricated conveyor which moves at a rate of 30 m/mn and are stopped by a stop ring while the conveyor continues to move. The first 18 bottles from the stop ring are the test bottles and they are followed by 16 conventional bottles to simulate usual treatment conditions. The test is repeated 15 times at 24 hour intervals. No substantial tear is noted on the bottles. Only the marks of the simulator roller guides are noted.

Having now described our invention what we claim as new and desire to secure by Letters Patent is:

1. Process for producing a coating on a glass or ceramic surface, comprising applying a first layer of a coating composition consisting of a hydroxylated material selected from the group consisting of hydroxylated polyesters, polycaprolactone-polyols and hydroxylated polyester-diisocyanate adducts, and of a cross-linking agent; thermally cross-linking said first layer; and applying a surface layer of a coating composition consisting of a film-forming material selected from the group consisting of hydroxylated polyesters, epoxy resins, modified epoxy resins and acrylic resins, and of a cross-linking agent; and thermally cross-linking the resulting surface layer.

2. Process as claimed in claim 1, wherein the cross-linked hydroxylated component of the first layer exhibits an elongation at break of at least 100%, and the cross-linked film-forming material of the surface layer exhibits an elongation at break of less than 10%.

3. Process as claimed in claim 1, wherein said cross-linking agent is selected from polyisocyanates, blocked polyisocyanates, polyanhydrides, melamines, amines, amides, imidazolines, imidazoles, epoxides, olefinically unsaturated monomers and carboxylated polyesters.

4. Process as claimed in claim 1, wherein the coating compositions for the surface layer and the first layer are applied as solutions in organic solvents or in dry powder form.

5. Process as claimed in claim 4, wherein the coating composition for the first layer is applied from solutions in organic solvents and the coating composition for the surface layer is applied in dry powder form.

6. Process as claimed in claim 1, wherein the surface layer and the first layer are applied in a thickness of 20–80 microns, preferably of 30–60 microns.

7. Process as claimed in claim 1, wherein the first layer consists of a polyester obtained from neopentylglycol, trimethylolpropane and azelaic acid, cross-linked with 1,6-hexamethylene diisocyanate biuret.

8. Process as claimed in claim 1, wherein the first layer consists of a polyester obtained from neopentylglycol, trimethylolpropane, isophthalic acid and adipic acid, cross-linked with 1,6-hexamethylene diisocyanate biuret.

9. Process as claimed in claim 1, wherein the first layer consists of a polyester obtained from neopentylglycol, trimethylolpropane, isophthalic acid and azelaic acid, cross-linked with 1,6-hexamethylene diisocyanate biuret.

10. Process as claimed in claim 1, wherein the first layer consists of a hydroxylated polyester-polyisocyanate adduct obtained from polycaprolactone, polyethylene glycol, trimethylolpropane and isophorone diisocyanate, cross-linked with 1,6-hexamethylene diisocyanate biuret.

11. Process as claimed in claim 1, wherein the first layer consists of a hydroxylated polyester obtained from polycaprolactone-diol, trimethylolpropane and azelaic acid, cross-linked with an isophorone diisocyanate polyisocyanate.

12. Process as claimed in claim 1, wherein the the surface layer consists of a saturated polyester resin based on terephthalic acid, 1,1-isopropylene-bis-(para-phenyleneoxy)diethanol and neopentylglycol, cross-linked with a blocked isocyanate based on isophorone diisocyanate, diethyleneglycol and caprolactame.

13. Process as claimed in claim 1 wherein the surface layer consists of an epoxy resin obtained from Bisphenol A and epichlorohydrin, having a molecular weight of 1000–2000, cross-linked with 2-phenylimidazoline.

* * * * *